US012554223B2

(12) United States Patent
Jiang

(10) Patent No.: US 12,554,223 B2
(45) Date of Patent: Feb. 17, 2026

(54) ROTARY KEY FORCE UNLOADING MECHANISM, AND ELECTRONIC DEVICE

(71) Applicant: GOERTEK INC., Shandong (CN)

(72) Inventor: Haode Jiang, Shandong (CN)

(73) Assignee: GOERTEK INC., Weifang (CN)

( * ) Notice: Subject to any disclaimer, the term of this patent is extended or adjusted under 35 U.S.C. 154(b) by 329 days.

(21) Appl. No.: 18/255,594

(22) PCT Filed: Nov. 17, 2021

(86) PCT No.: PCT/CN2021/131043
§ 371 (c)(1),
(2) Date: Jun. 2, 2023

(87) PCT Pub. No.: WO2022/116817
PCT Pub. Date: Jun. 9, 2022

(65) Prior Publication Data

US 2024/0027962 A1 Jan. 25, 2024

(30) Foreign Application Priority Data

Dec. 2, 2020 (CN) ........................ 202011389682.1

(51) Int. Cl.
*G04B 3/04* (2006.01)

(52) U.S. Cl.
CPC .................................. *G04B 3/041* (2013.01)

(58) Field of Classification Search
CPC ........ G04B 3/041; G04B 37/106; G04B 3/04; G04B 3/046; H01H 25/06; G04G 21/08; G04C 3/008; G04C 3/004
See application file for complete search history.

(56) References Cited

U.S. PATENT DOCUMENTS

| | | | | |
|---|---|---|---|---|
| 11,042,122 | B2 * | 6/2021 | Iguchi | G04B 3/041 |
| 11,366,428 | B2 * | 6/2022 | Avril | G04G 21/00 |
| 11,762,335 | B2 * | 9/2023 | Avril | G04G 21/08 368/308 |

(Continued)

FOREIGN PATENT DOCUMENTS

| | | | |
|---|---|---|---|
| CN | 106098453 | A | 11/2016 |
| CN | 206349288 | U | 7/2017 |

(Continued)

OTHER PUBLICATIONS

International Search Report from International Application No. PCT/CN2021/131043 mailed Jan. 29, 2022.

*Primary Examiner* — Edwin A. Leon
(74) *Attorney, Agent, or Firm* — Shih IP Law Group, PLLC

(57) ABSTRACT

Embodiments of the present disclosure disclose a rotary key force unloading mechanism, and an electronic device. The rotary key force unloading mechanism includes a key, a bourdon tube, and a cover cap; the cover cap is axially movable relative to the bourdon tube, and the cover cap and the bourdon tube are connected by an axially retractable elastic member; a stem portion of the key passes through the bourdon tube and the cover cap, so that the elastic member is compressed when the cover cap is pressed by a key cap of the key; and the stem portion of the key is provided with a limiting member for preventing separation, and when no axial force is applied on the key, no interaction forces exist between the limiting member and the bourdon tube.

9 Claims, 7 Drawing Sheets

(56) References Cited

U.S. PATENT DOCUMENTS

2010/0187074 A1 7/2010 Manni

FOREIGN PATENT DOCUMENTS

| | | | |
|---|---|---|---|
| CN | 209328754 | U | 8/2019 |
| CN | 209447716 | U | 9/2019 |
| CN | 210136394 | U | 3/2020 |
| CN | 112582197 | A | 3/2021 |
| JP | H08262150 | A | 10/1996 |
| JP | 2006260826 | A | 9/2006 |

* cited by examiner

ROTARY KEY FORCE UNLOADING MECHANISM, AND ELECTRONIC DEVICE

This disclosure claims the priority and benefits of Chinese Patent Application No. 202011389682.1, titled "ROTARY KEY FORCE UNLOADING MECHANISM, AND ELECTRONIC DEVICE", filed in China Patent Office on Dec. 2, 2020, the entire contents of which are incorporated into the present disclosure by reference.

TECHNICAL FIELD

The present disclosure relates to the technical field of electronic device, and more specifically, to a rotary key force unloading mechanism. In addition, the present disclosure also relates to an electronic device including the rotary key force unloading mechanism.

DESCRIPTION OF RELATED ART

Operation keys on common wearable devices need to be able to realize operations of pressing and rotating, and generally, in terms of structure, a key and a base are connected by a key return spring. When the key is pressed, the key return spring may directly or indirectly apply a reaction force to the key, so that a snap spring fitted to a key stem is held tightly against a bourdon tube. However, when the key is rotated, the snap spring rubs against the bourdon tube, which produces abnormal noise and affects the rotation life of the key.

Therefore, how to avoid reducing the rotation life of the key is an urgent problem to be solved by those skilled in the art.

SUMMARY

In view of above, an object of the present disclosure is to provide a rotary key force unloading mechanism, which can avoid friction between the snap spring and the bourdon tube during rotation and ensure the rotation life of the key.

Another object of the present disclosure is to provide an electronic device including the above-mentioned rotary key force unloading mechanism.

In order to achieve the above object, the present disclosure provides the following technical solutions:

A rotary key force unloading mechanism includes a key, a bourdon tube, and a cover cap; the cover cap is axially movable relative to the bourdon tube, and the cover cap and the bourdon tube are connected by an axially retractable elastic member; a stem portion of the key passes through the bourdon tube and the cover cap, so that the elastic member is compressed when the cover cap is pressed by a key cap of the key; and the stem portion of the key is provided with a limiting member for preventing separation, and when no axial force is applied on the key, no interaction forces exist between the limiting member and the bourdon tube.

Preferably, one of the bourdon tube and the cover cap is provided with a buckle, and the other one is provided with a buckle groove that is engaged with the buckle, and the bourdon tube is clamped with the cover cap and is movable relatively with a limited displacement in an axial direction.

Preferably, the buckle is an L-shaped buckle, and the buckle groove is an L-shaped groove that is engaged with the buckle through a circumferential rotation after an axial insertion.

Preferably, the bourdon tube is provided with at least three buckles that protrude in a circumferential direction, and an end surface of the cover cap is provided with the buckle groove that is engaged with the buckle.

Preferably, the elastic member is a spring, and when the bourdon tube is engaged with the cover cap, the spring is in a compressed state, and an elastic restoring force acts on the cover cap so that the cover cap is located axially away from the bourdon tube.

Preferably, the elastic member is a spring, one end of the spring is fixed to the bourdon tube, and the other end thereof is fixed to the cover cap, and when no external force acts on the key, the spring is in a natural state.

Preferably, the key cap of the key includes a top portion in contact with the end surface of the cover cap and a peripheral portion surrounding a circumferential surface of the cover cap, and the peripheral portion and the top portion are integrally structured.

Preferably, the top portion is clearance fitted with the end of the cover cap, and the peripheral portion is clearance fitted with the circumferential surface of the cover cap; or the top portion is in point-surface contact fit with the end of the cover cap, and the peripheral portion is in point-surface contact fit with the circumferential surface of the cover cap.

Preferably, the bourdon tube is provided with a bourdon tube thread connected to a device body, and one side of the bourdon tube thread is provided with a bourdon tube sealing ring for sealing; and/or the stem portion of the key or an inner portion of the bourdon tube is provided with a sealing groove, and a key stem sealing ring for sealing the bourdon tube and the stem portion is provided inside the sealing groove.

An electronic device includes a device body and a rotary key mechanism installed on the device body, and the rotary key mechanism is the above-mentioned rotary key force unloading mechanism.

In the elastic member force unloading mechanism for rotary key provided by the present disclosure, a stem portion of the key is sleeved on a retractable structure formed by the bourdon tube, the cover cap and the elastic member, and a snap spring for preventing the key from separation is provided on the stem portion so as to limit the movement of the key. When the key is axially moved under a pressing force, the key cap of the key presses the cover cap, the cover cap compresses the elastic member, and a reaction force of the elastic member drives the key to return back; and if no external force is applied on the key, as the force of the elastic member acts on the cover cap and no pressing force is generated between the snap spring and the bourdon tube, the cover cap does not transfer a force to the key cap of the key and the snap ring on the key and the bourdon tube are not pressed, when the key is rotated, no friction force is generated between the snap spring fixed on the key and the bourdon tube, thus avoiding the occurrence of abnormal sound during rotation, and the service life of the structure being not affected.

The present disclosure also provides an electronic device including the above-mentioned elastic member force unloading mechanism for rotary key.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

Figure 1:
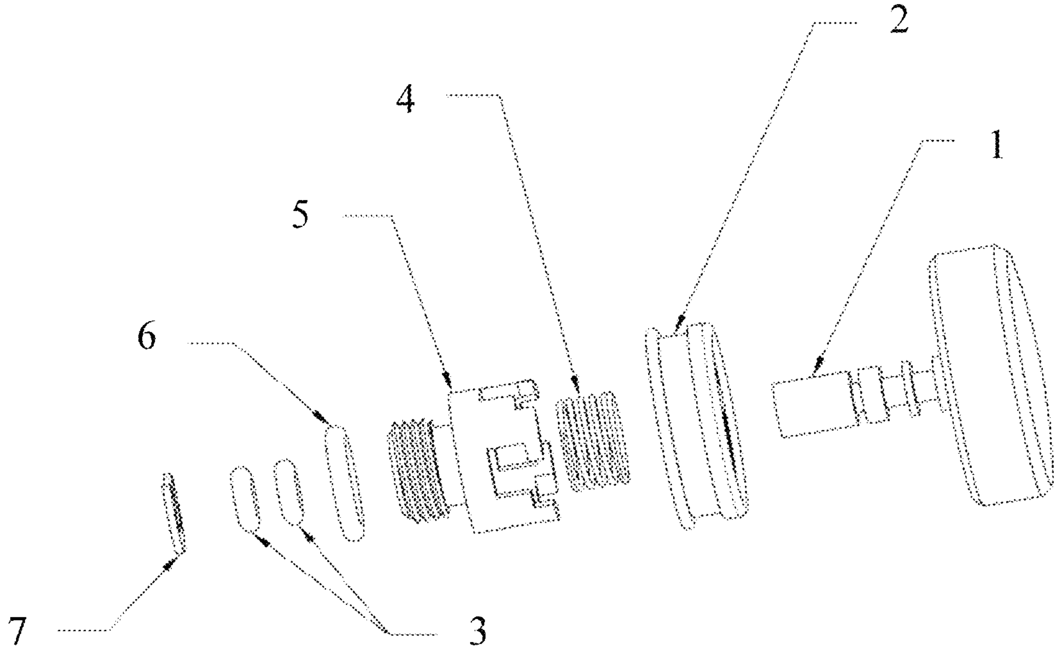
FIG. 1 is an exploded view of a rotary key force unloading mechanism according to the present disclosure.

Reference numerals in the drawings are as follows: key 1, cover cap 2, key stem sealing ring 3, elastic member 4, bourdon tube 5, bourdon tube sealing ring 6, limiting member 7, buckle groove 21, step structure 51.

DETAILED DESCRIPTIONS

Technical solutions of embodiments of the present disclosure will be described clearly and completely below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

An object of the present disclosure is to provide a rotary key force unloading mechanism, which can avoid friction between the snap spring and the bourdon tube during rotation.

Another object of the present disclosure is to provide an electronic device including the above-mentioned rotary key force unloading mechanism.

Figure 2:
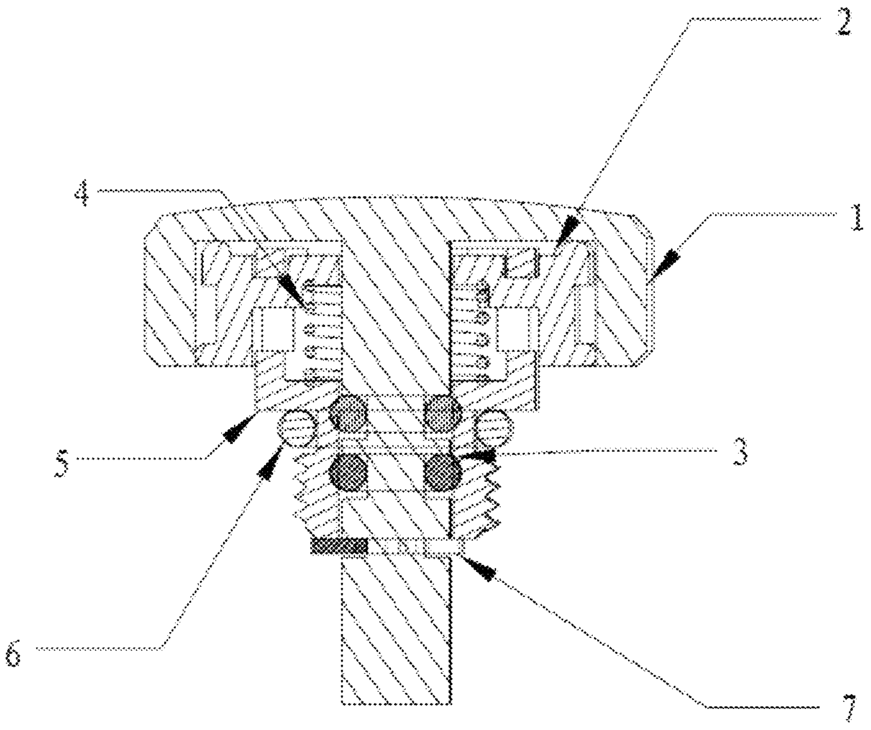
FIG. 2 is a sectional view of the rotary key force unloading mechanism according to the present disclosure.
Figure 3:
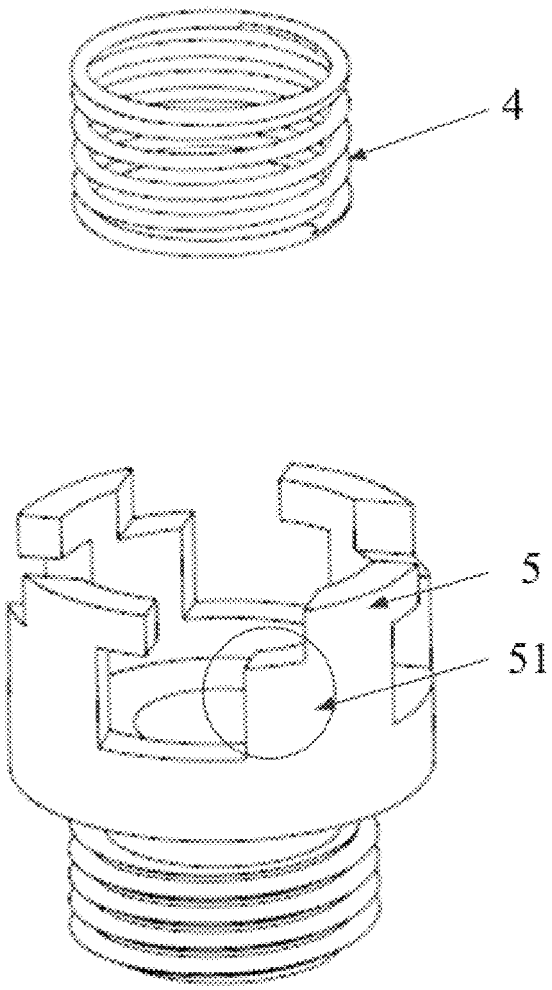
FIG. 3 is an assembly diagram for a first step of the rotary key force unloading mechanism according to the present disclosure.

Referring to FIGS. 1 and 2, FIG. 1 is an exploded view of a rotary key force unloading mechanism according to the present disclosure, and FIG. 2 is a sectional view of the rotary key force unloading mechanism according to the present disclosure.

The present disclosure provides a rotary key force unloading mechanism, which is mainly used for keys of an electronic device and can improve the service life of the rotary key.

The elastic member force unloading mechanism for rotary key structurally includes a key 1, a bourdon tube 5, an elastic member 4 and a cover cap 2.

The bourdon tube 5 is a component installed on a device body. The bourdon tube 5 has a groove, and upper and lower spaces of the groove are communicated through a middle hole. The cover cap 2 is axially movable relative to the middle hole of the bourdon tube 5, and the cover cap 2 and the bourdon tube 5 are connected by an axially retractable elastic member 4.

The key 1 includes a stem portion and a key cap connected to an end of the stem portion. The stem portion of the key 1 passes through the bourdon tube 5 and the cover cap 2, the key cap of the key 1 is opposite to the cover cap, and when the key cap of the key 1 presses the cover cap 2, the elastic member 4 is compressed by the cover cap 2.

The stem portion of the key 1 is provided with a limiting member 7 for preventing separation, and when no axial force is applied on the key 1, no interaction forces exist between the limiting member 7 and the bourdon tube 5.

It should be noted that the stem portion of the key 1 passes through the cover cap 2, the bourdon tube 5 and the device body in sequence, so that an inner side of the key cap of the key 1 faces the cover cap 2, and at this time, the other end of the stem portion may be provided with the limiting member 7 for preventing the stem portion of the key 1 from detaching from the cover cap 2, the bourdon tube 5 and the device body. Specifically, the limiting member 7 may be a clamping member or the like, such as a snap spring.

When the key cap of the key 1 is subjected to an axial pressing force, it moves axially to press the cover cap 2, the cover cap 2 compresses the elastic member 4 and the elastic member 4 is retracted and deformed. When the pressing force is removed, an elastic restoring force of the elastic member 4 acts on the cover cap 2 so that the cover cap 2 drives the key cap to return back to push the key 1 to be restored.

When no axial force is applied on the key 1, the force of the elastic member 4 acts on the cover cap 2 and the limiting member 7 is just in a position where no relative force is generated between the key 1 and the cover cap 2 and the bourdon tube 5, that is, a position where no interaction force is generated between the limiting member 7 and the bourdon tube 5, so when the key 1 is rotated, no pressing force is generated between the limiting member 7 and the bourdon tube 5, and accordingly, no friction force is generated therebetween, so that a friction damage is avoided.

In the elastic member force unloading mechanism for rotary key provided by the present disclosure, a stem portion of the key is sleeved on a retractable structure formed by the bourdon tube, the cover cap and the elastic member, and a snap spring for preventing the key from separation is provided on the stem portion so as to limit the movement of the key. When the key is axially moved under a pressing force, the key cap of the key presses the cover cap, the cover cap compresses the elastic member, and a reaction force of the elastic member drives the key to return back; and if no external force is applied on the key, as the force of the elastic member acts on the cover cap and no pressing force is generated between the snap spring and the bourdon tube, the cover cap does not transfer a force to the key cap of the key and the snap ring on the key and the bourdon tube are not pressed, when the key is rotated, no friction force is generated between the snap spring fixed on the key and the bourdon tube, thus avoiding the occurrence of abnormal sound during rotation, and the service life of the structure being not affected.

The cover cap 2 and the bourdon tube 5 may be connected in various methods, one of which utilizes an elastic member to connect the two so that the two can move telescopically in a natural state of the elastic member.

Specifically, the elastic member 4 is a spring, one end of the spring is fixed to the bourdon tube 5 and the other end is fixed to the cover cap 2, and when no external force acts on the key 1, the spring is in a natural state.

It should be noted that the ends of the spring are fixed to the bourdon tube 5 and the cover cap 2 respectively, and the spring can provide a pulling force or a pushing force to the both. The key 1 passes through the cover cap 2 and the bourdon tube 5, and is connected to the limiting member. When no external force is applied to the key 1, the key 1 is just in a position where there is no pressing force on the cover cap 2, thus the cover cap 2 is not under a pressing force and the spring is in a natural state. When the key 1 is pressed and pushes the cover cap 2, the spring is deformed and retracted, and when the external force is removed, the spring pushes the cover cap 2, and further pushes the key 1 to be restored, and the spring returns to the natural state and the restoration of the key 1 is completed.

In addition to the above-mentioned situation, the connection relationship between the bourdon tube 5 and the cover cap 2 can also be adjusted to more accurately control the position corresponding to a case where no relative friction is generated between the limiting member 7 and the bourdon tube 5.

On the basis of the above-mentioned embodiments, one of the bourdon tube 5 and the cover cap 2 is provided with a buckle, and the other one is provided with a buckle groove 21 that is engaged with the buckle, and the bourdon tube 5 is clamped with the cover cap 2 and is movable relatively with a limited displacement in an axial direction.

Specifically, the bourdon tube 5 and the cover cap 2 form a clamping connection by means of circumferential screwing, and can move axially in the clamping state. Since they are clamped in a circumferential direction and can realize a limited displacement in the axial direction, a maximum axial distance between the bourdon tube 5 and the cover cap 2 can be determined, and the limiting member 7 is provided when the key 1 is adjusted to a position corresponding to the maximum distance, which can ensure that there is no friction between the bourdon tube 5 and the limiting member 7.

On the basis of the above-mentioned embodiments, the buckle is an L-shaped buckle, and the buckle groove 21 is an L-shaped groove that is engaged with the buckle through a circumferential rotation after an axial insertion.

Figure 4:
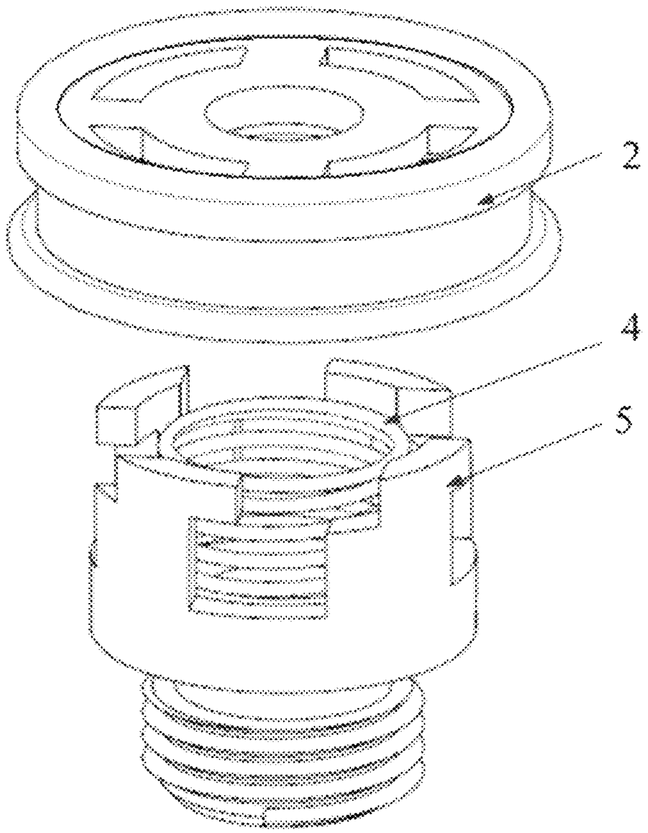
FIG. 4 is an assembly diagram for a second step of the rotary key force unloading mechanism according to the present disclosure.

Referring to FIG. 1, an L-shaped buckle is provided on an end surface of the bourdon tube 5. Referring to FIG. 4, an L-shaped groove is provided on the cover cap 2. Through a circumferential rotation after an axial insertion, a stable connection of the two in the circumferential direction can be formed.

Optionally, the bourdon tube 5 is provided with at least three buckles protruding in the circumferential direction, and the end surface of the cover cap 2 is provided with a buckle groove 21 that is engaged with the buckle.

Figure 5:
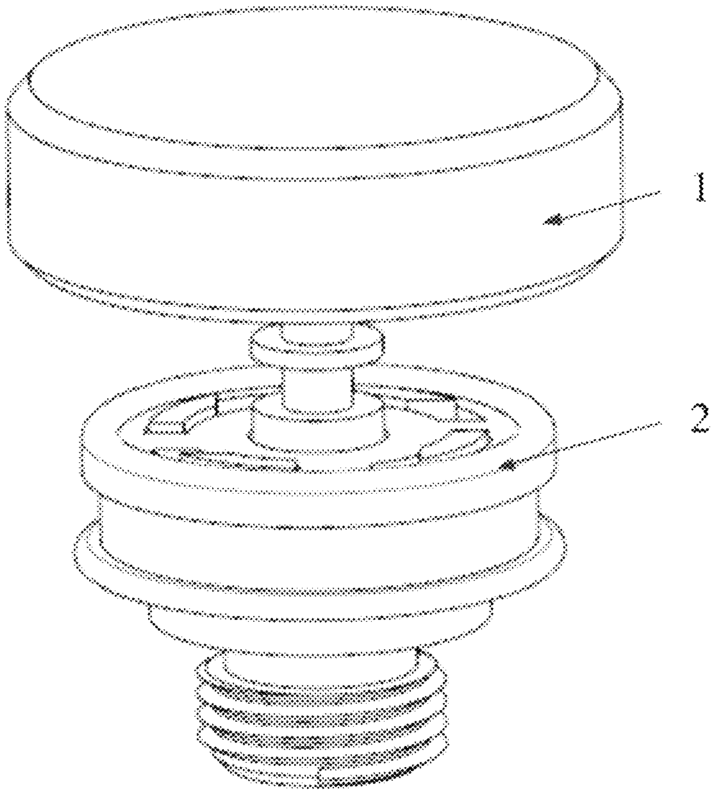
FIG. 5 is an assembly diagram for a third step of the rotary key force unloading mechanism according to the present disclosure.

Referring to FIGS. 1 and 4-5, four L-shaped buckles are provided on the bourdon tube 5, and four buckle grooves 21 are provided on the end surface of the cover cap 2, each L-shaped buckle is connected to a corresponding L-shaped buckle groove 21, and the connections are all in clockwise or counterclockwise direction.

Optionally, a step structure 51 is provided on a side of the L-shaped buckle groove 21 for forming a zigzag groove between two adjacent L-shaped buckles. During clamping installation, the cover cap 2 is pressed down axially to fit the step structure 51, and the L-shaped buckle groove 21 of the cover cap 2 is aligned with the L-shaped buckle; then the cover cap 2 is controlled to rotate in the circumferential direction, so that the L-shaped buckle groove 21 is engaged with the L-shaped buckle; finally, the cover cap 2 is controlled to pressed down again to enter the bottom of the zigzag groove so as to avoid accidental disengagement and complete the clamping connection of the cover cap 2 and the bourdon tube 5.

Optionally, the structure for clamping connection may also be other types of structures.

In the above-mentioned different connection methods and connection structures, the elastic member 4 may be in a natural state or a compressed state.

In a specific embodiment, when the bourdon tube 5 is engaged with the cover cap 2, the spring is in a compressed state, the elastic restoring force acts on the cover cap 2, so that the cover cap 2 is located axially away from the bourdon tube 5.

In the above structure, the restoring force of the compressed spring acts on the bourdon tube 5 and the cover cap 2, since the bourdon tube 5 is fixed on the device body, the cover cap 2 may be pushed away from the bourdon tube 5 by the spring. However, due to a clamping state with limited movement of the bourdon tube 5 and the cover cap 2, a distance therebetween has been determined, so the cover cap 2 may be located at the farthest position away from the bourdon tube 5 in its axial movement stroke. By providing the key 1 and the limiting member 7 at this position, it can be accurately determined that this position is the position where no force is generated between the limiting member 7 and the bourdon tube 5.

Optionally, the elastic member 4 is a spring, and the direction of the restoring force of the spring is in a straight line, which is a direction capable of forming a stable force.

In any one of the above-mentioned embodiments, the cover cap 2 is a disk-like structure, and is disposed to be engaged with the bourdon tube 5 by means of a groove on its end surface.

On the basis of the above-mentioned embodiments, the key cap of the key 1 includes a top portion in contact with the end surface of the cover cap 2 and a peripheral portion surrounding a circumferential surface of the cover cap 2, and the peripheral portion and the top portion are integrally structured.

The key cap of the key 1 is a cap-shaped structure with a top portion in contact with the cover cap 2 and a peripheral portion located at a peripheral position of the cover cap 2.

The cap-shaped structure formed by the key cap can cover the outside of the cover cap 2, and is sleeved on the outside of the cover cap 2. Compared with the key cap that is completely arranged on the top of the cover cap 2, the key cap of the present disclosure can avoid increasing the space occupation in the axial direction and save the space occupied by the key 1.

On the basis of the foregoing, the top portion is clearance fitted with the end of the cover cap 2, and the peripheral portion is clearance-fitted with the circumferential surface of the cover cap 2. It should be noted that the clearance fit is mainly used in a case where the bourdon tube 5 and the cover cap 2 are clamped in addition to be connected by means of the elastic member 4. The clearance fit can better prevent the rotation of the key 1 from affecting the circumferential position of the cover cap 2 and avoid driving the cover cap 2 to rotate to make the clamping failure.

Optionally, the top portion is in point-surface contact fit with the end of the cover cap 2, and the peripheral portion is in point-surface contact fit with the circumferential surface of the cover cap 2. Such structure may be used in a case where the cover cap 2 is connected to the bourdon tube 5 only by the elastic member 4.

On the basis of the above-mentioned embodiments, the bourdon tube 5 is provided with a bourdon tube thread connected to the device body, and one side of the bourdon tube thread is provided with a bourdon tube sealing ring 6 for sealing; and/or the stem portion of the key 1 or an inner portion of the bourdon tube 5 is provided with a sealing groove, and a key stem sealing ring 3 for sealing the bourdon tube 5 and the stem portion is provided inside the sealing groove.

It should be noted that the position of the key stem sealing ring 3 may be at any position of the stem portion, and the number thereof may be adjusted according to the situation. For example, two or more key stem sealing rings 3 are disposed at a lower portion of the bourdon tube 5 that is fitted with the stem portion. The bourdon tube sealing ring 6 is disposed outside the bourdon tube 5 and can form a seal between the bourdon tube 5 and the device body.

Figure 6:
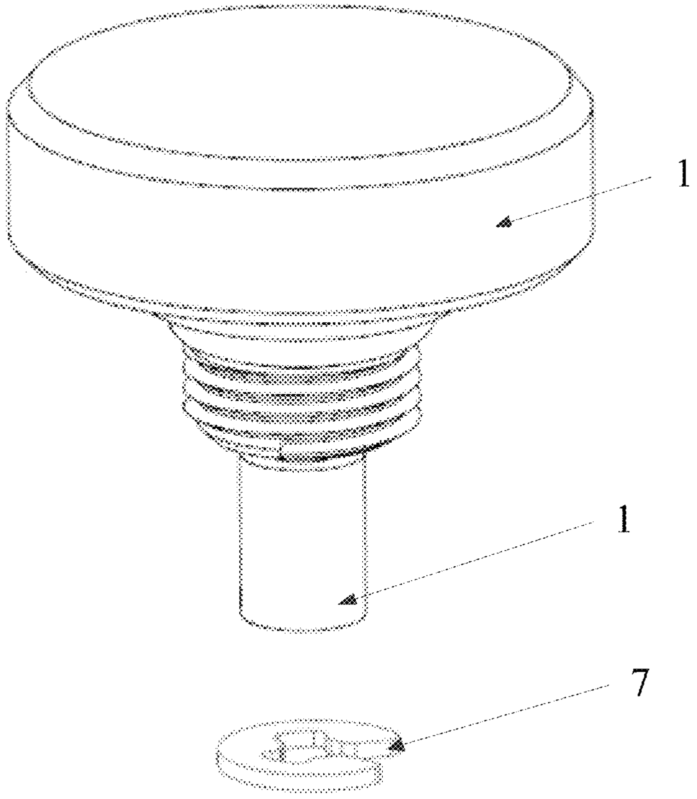
FIG. 6 is an assembly diagram for a fourth step of the rotary key force unloading mechanism according to the present disclosure.
Figure 7:
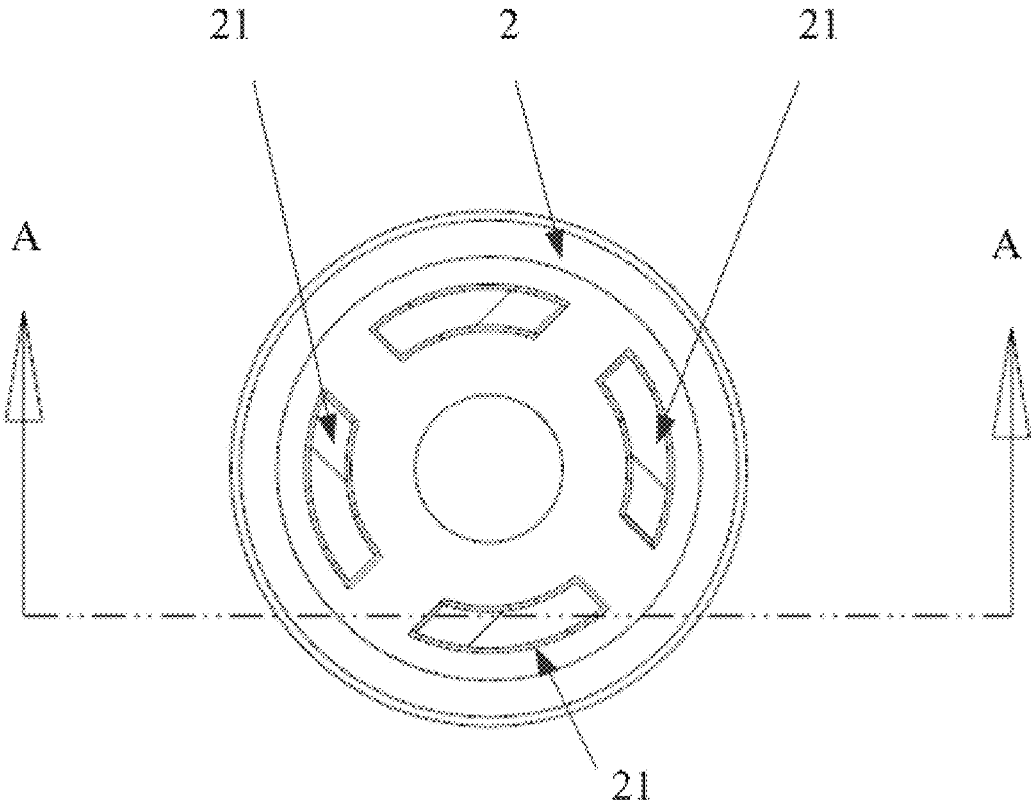
FIG. 7 is a bottom view of a cover cap.
Figure 8:
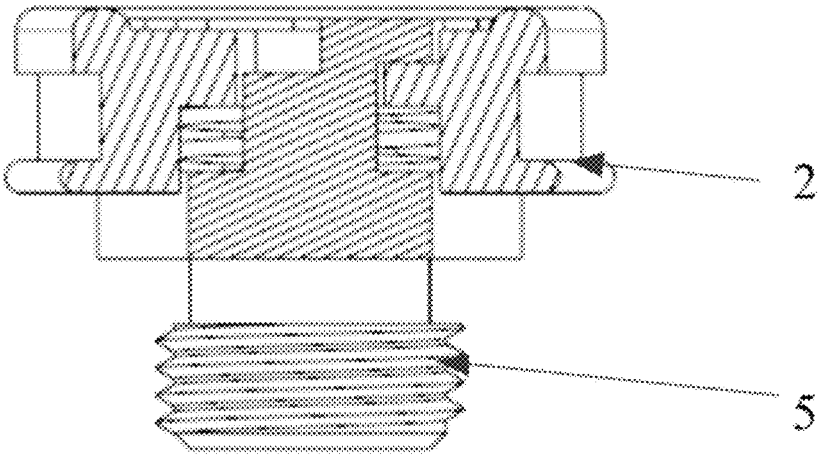
FIG. 8 is a sectional view taken along line A-A of FIG. 7.

Referring to FIGS. 3 to 6, FIG. 3 is an assembly diagram for a first step of the rotary key force unloading mechanism according to the present disclosure; FIG. 4 is an assembly diagram for a second step of the rotary key force unloading mechanism according to the present disclosure; FIG. 5 is an assembly diagram for a third step of the rotary key force unloading mechanism according to the present disclosure; FIG. 6 is an assembly diagram for a fourth step of the rotary key force unloading mechanism according to the present disclosure.

The installation process mainly includes: firstly, putting the elastic member 4 into the groove of the bourdon tube 5, secondly, buckling the cover cap 2 on the end of the bourdon tube 5 so that the L-shaped buckle and the L-shaped groove are aligned, and screwing the cover cap 2 so that the cover cap 2 and the bourdon tube 5 are clamped, thirdly, penetrating the stem portion of the key 1 through the cover cap 2 and the bourdon tube 5 and out from one side of the device body, and finally, providing a snap spring on the stem portion penetrated out to limit the removal of the stem portion.

According to the rotary key force unloading mechanism provided by the present disclosure, the stem portion of the key 1 is sleeved on the bourdon tube 5, and the bourdon tube 5 is connected to the cover cap 2 through the elastic member 4, the cover cap 2 can move axially relative to the bourdon tube 5, the stem portion of the key 1 passes through the bourdon tube 5 and the cover cap 2, and the stem portion is provided with a snap spring for preventing the stem portion from separation. When the key 1 is moved under a pressing force, the bourdon tube 5 is connected at a fixed position and does not move, the key cap of the key 1 presses the cover cap 2, and the elastic member 4 is compressed. The elastic member 4 is compressibly disposed between the bourdon tube 5 and the cover cap 2, that is, the bourdon tube 5 and the cover cap 2 clamp the elastic member 4 so as to prevent the elastic member 4 from directly forming an axial pressing force on the key 1, and avoid forming a pressing force between the snap spring disposed on the stem portion and the bourdon tube 5. The rotation of the key 1 may not cause friction between the snap spring and the bourdon tube 5 in the circumferential direction, thus avoiding the occurrence of abnormal sound by the snap spring and the bourdon tube 5 during rotation, and improving the service life of them.

In addition to the rotary key force unloading mechanism provided in the above embodiments, the present disclosure also provides an electronic device including the above rotary key force unloading mechanism, the electronic device includes a device body and a rotary key mechanism installed on the device body, and the rotary key mechanism is the above-mentioned rotary key force unloading mechanism.

In addition, the above-mentioned electronic device may be a watch, a wristband, etc., and the above-mentioned rotary key force unloading mechanism may be a key mechanism provided thereon.

For the structures of other parts of the electronic device, please refer to the prior art, which will not be repeated herein.

The various embodiments in the present specification are described in a progressive manner, and each embodiment focuses on the differences from other embodiments, and the same and similar parts between the various embodiments can be referred to each other.

The rotary key force unloading mechanism and electronic device provided by the present disclosure have been introduced in detail above. The principles and embodiments of the present disclosure are illustrated through specific examples, and the descriptions of the above embodiments are only used to help understand the methods and core ideas of the present disclosure. It should be understood that various modifications and improvements to the disclosure without departing from the principles of the present disclosure will be readily apparent to those skilled in the art, and these modifications and improvements also fall within the protection scope of the claims of the disclosure.

What is claimed is:

1. A rotary key force unloading mechanism comprising a key, a bourdon tube, and a cover cap;

wherein the cover cap is axially movable relative to the bourdon tube, and the cover cap and the bourdon tube are connected by an axially retractable elastic member;

wherein a stem portion of the key passes through the bourdon tube and the cover cap, so that the elastic member is compressed when the cover cap is pressed by a key cap of the key; and wherein the stem portion of the key is provided with a limiting member for preventing separation, and when no axial force is applied to the key, no interaction forces exist between the limiting member and the bourdon tube, and wherein one of the bourdon tube and the cover cap is provided with a buckle, and the other one is provided with a buckle groove that is engaged with the buckle, and the bourdon tube is coupled with the cover cap and is movable relatively with a limited displacement in an axial direction.

2. The rotary key force unloading mechanism of claim 1, wherein the buckle is an L-shaped buckle, and the buckle groove is an L-shaped groove that is engaged with the buckle through a circumferential rotation after an axial insertion.

3. The rotary key force unloading mechanism of claim 1, wherein the bourdon tube is provided with at least three buckles that protrude in a circumferential direction, and an end surface of the cover cap is provided with the buckle groove that is engaged with the buckle.

4. The rotary key force unloading mechanism of claim 1, wherein the elastic member is a spring, and when the bourdon tube is engaged with the cover cap, the spring is in a compressed state, and an elastic restoring force is applied to the cover cap so that the cover cap is maintained at a position axially away from the bourdon tube.

5. The rotary key force unloading mechanism of claim 1, wherein the elastic member is a spring, one end of the spring is fixed to the bourdon tube, and the other end thereof is fixed to the cover cap, and when no external force is applied to the key, the spring is in a natural state.

6. The rotary key force unloading mechanism of claim 1, wherein the key cap of the key comprises a top portion in contact with the end surface of the cover cap and a peripheral portion surrounding a circumferential surface of the cover cap, and the peripheral portion and the top portion are integrally structured.

7. The rotary key force unloading mechanism of claim 6, wherein the top portion is clearance-fitted with the end of the cover cap, and the peripheral portion is clearance-fitted with the circumferential surface of the cover cap; or wherein the top portion is in point-surface contact fit with the end of the cover cap, and the peripheral portion is in point-surface contact fit with the circumferential surface of the cover cap.

8. The rotary key force unloading mechanism of claim 1, wherein the bourdon tube is provided with a bourdon tube thread connected to a device body, and one side of the bourdon tube thread is provided with a bourdon tube sealing ring for sealing; and/or wherein the stem portion of the key or an inner portion of the bourdon tube is provided with a sealing groove, and a key stem sealing ring for sealing the bourdon tube and the stem portion is provided inside the sealing groove.

9. An electronic device, comprising a device body and a rotary key mechanism installed on the device body, wherein the rotary key mechanism is the rotary key force unloading mechanism of claim 1.

* * * * *